United States Patent
Kim et al.

(10) Patent No.: US 8,565,356 B2
(45) Date of Patent: Oct. 22, 2013

(54) METHOD AND APPARATUS TO DETECT A SYMBOL IN RECEIVER INCLUDING MULTIPLE RECEIVING ANTENNAS

(75) Inventors: Jong Han Kim, Suwon-si (KR); Jun Ha Im, Seoul (KR); Chang Soon Park, Chungju-si (KR); Young Jun Hong, Seoul (KR); Joon Seong Kang, Seoul (KR); Jae Seok Kim, Seoul (KR)

(73) Assignees: Samsung Electronics Co., Ltd., Suwon-si (KR); Industry-Academic Cooperation Foundation, Yonsei University, Seoul (KR)

( * ) Notice: Subject to any disclaimer, the term of this patent is extended or adjusted under 35 U.S.C. 154(b) by 0 days.

(21) Appl. No.: 13/484,356

(22) Filed: May 31, 2012

(65) Prior Publication Data

US 2013/0101013 A1 Apr. 25, 2013

(30) Foreign Application Priority Data

Oct. 25, 2011 (KR) .................. 10-2011-0109269

(51) Int. Cl.
- *H04L 27/06* (2006.01)
- *H04L 12/28* (2006.01)
- *H04L 1/02* (2006.01)
- *H03M 13/03* (2006.01)

(52) U.S. Cl.
USPC ........... 375/341; 375/340; 375/316; 370/389; 370/351; 714/795; 714/786; 714/746; 714/699

(58) Field of Classification Search
USPC .................. 375/341, 340, 316; 370/389, 351; 714/795, 786, 746, 699
See application file for complete search history.

(56) References Cited

U.S. PATENT DOCUMENTS

| | | | |
|---|---|---|---|
| 5,706,428 A * | 1/1998 | Boer et al. | 370/342 |
| 2005/0154955 A1 * | 7/2005 | Cai et al. | 714/746 |
| 2006/0026494 A1 * | 2/2006 | Varma et al. | 714/795 |
| 2006/0285578 A1 * | 12/2006 | Weisenhorn et al. | 375/130 |
| 2008/0212720 A1 | 9/2008 | Rjeily | |
| 2009/0097606 A1 * | 4/2009 | Hutchins et al. | 375/376 |
| 2010/0014561 A1 | 1/2010 | Rjeily | |
| 2013/0082867 A1 * | 4/2013 | Malaga | 342/40 |

FOREIGN PATENT DOCUMENTS

| | | |
|---|---|---|
| JP | 2011-114435 A | 6/2011 |
| KR | 10-2009-0061564 | 6/2009 |
| KR | 10-2011-0040289 A | 4/2011 |

OTHER PUBLICATIONS

Ali, H.H.; El-Matbouly, M.; Ei-Sayed a.Youssef, "Cmos circuit realization of a truncated Viterbi decoder using pipeline technique," Radio Science Conference, 2001. Nrsc 2001. Proceedings of the Eighteenth National , vol. 2, no., pp. 525,529.*

* cited by examiner

*Primary Examiner* — Chieh M Fan
*Assistant Examiner* — Michelle M Koeth
(74) *Attorney, Agent, or Firm* — NSIP Law

(57) ABSTRACT

A receiver of a wireless communication system and method thereof include antennas configured to receive data, wherein the data comprises a preamble, a header, and a payload. The receiver also includes a synchronizer configured to perform time synchronization of the data received through corresponding paths of each antenna using corresponding preambles of the data. The receiver includes a header detector configured to detect a header from the data of each of the paths. A surviving path selector in the receiver is configured to select a signal of a surviving path from among the paths based on the header or the preamble. The receiver also includes combiner configured to combine the signal existing in the surviving path to demodulate the payload.

19 Claims, 6 Drawing Sheets

METHOD AND APPARATUS TO DETECT A SYMBOL IN RECEIVER INCLUDING MULTIPLE RECEIVING ANTENNAS

CROSS-REFERENCE TO RELATED APPLICATION(S)

This application claims the benefit under 35 U.S.C. §119(a) of Korean Patent Application No. 10-2011-0109269, filed on Oct. 25, 2011, in the Korean Intellectual Property Office, the entire disclosure of which is incorporated herein by reference for all purposes.

BACKGROUND

1. Field

The following description relates to a method of detecting a symbol in a receiver including multiple receiving antennas.

2. Description of Related Art

A reduction in power consumption is important in a wireless communication system. A pulse position modulation (PPM) scheme may be utilized to achieve the reduction in power consumption. The PPM scheme may divide bits to be transmitted into groups including L bits. The L bits included in a group may be expressed based on one of symbol sections including $2^L$ bits. For example, when three bits are included in a single group, the PPM scheme may express the three bits by generating a pulse in one of eight symbol sections. Conversely, a receiver may detect a symbol section including a pulse based on a pulse position demodulation (PPD) scheme and schemes thereof, so as to extract the three bits.

When the receiver includes a plurality of receiving antennas, the receiver may obtain a diversity gain, and may improve a reception performance.

SUMMARY

Embodiments may select an appropriate surviving path so as to improve performance in detecting a Pulse Position Modulation (PPM) symbol or an On-Off Keying (OOK) symbol in a receiver including a plurality of receiving antennas.

Embodiments may perform time synchronization with respect to paths so as to accurately detect a pulse when a PPM symbol or an OOK symbol is detected to improve performance in detecting the PPM symbol or OOK symbol. In addition, embodiments may accurately detect positions of pulses and may combine the detected pulses so as to improve a diversity gain.

In accordance with an illustrative example, there is provided a receiver of a wireless communication system. The receiver includes antennas configured to receive data. The data comprises a preamble, a header, and a payload. The receiver also includes a synchronizer configured to perform time synchronization of the data received through corresponding paths of each antenna using corresponding preambles of the data. The receiver includes a header detector configured to detect a header from the data of each of the paths. The receiver further includes a surviving path selector configured to select a signal of a surviving path from among the paths based on the header or the preamble. A combiner in the receiver is configured to combine the signal existing in the surviving path to demodulate the payload.

The receiver also includes an envelope detector configured to detect an envelope of data received from each of the paths, and provide the detected envelope to the synchronizer.

The receiver further includes a determining unit configured to determine bits corresponding to the payload based on the combination of the signal existing in the surviving path.

The determining unit is configured to determine the bits based on a pulse position demodulation (PPD) scheme, when the payload is modulated based on a pulse position modulation (PPM) scheme.

The receiver includes a parameter calculator configured to calculate at least one parameter associated with a probability distribution of a sample in each path based on the preamble, and a signal corrector configured to correct the sample in each path using the at least one parameter.

The signal corrector corrects a sample in each path using the at least one parameter based on a type of a probability distribution of the sample.

The type of the probability distribution of the sample comprises a Chi-square distribution or an asymmetrical Gaussian distribution.

The header detector is configured to detect an error check bit included in the header, and the surviving path selector is configured to select the surviving path from among the paths based on the error check bit.

The header includes a transmission format indicator (TFI) of the payload or a length indicator (LI), and the TFI indicates at least one of a modulation scheme of the payload, a spreading factor, and a data rate.

The surviving path selector selects the surviving path based on information comprising whether headers in the paths are the same, a number of the same headers among headers in the paths, and/or a reliability with respect to each path.

The parameter calculator is configured to calculate a mean value and a variance value associated with a probability distribution of a corresponding sample.

The surviving path selector is configured to select signals of all surviving paths when all headers of the signals in the paths are the same.

The surviving path selector is configured to select a number of the same headers as surviving paths when a number of the same headers among the headers in the paths are relatively greater than a number of remaining headers.

When headers in the paths are different from each other, the surviving path selector is configured to consider a reliability of each path. The reliability of each path is determined based on an amplitude of a signal component of a received signal, a ratio of power of a signal component to power of a noise component, and a signal-to-noise ratio.

In accordance with an alternative example, there is provided a method for a receiver of a wireless communication system. The method includes receiving, through antennas, data, which includes a preamble, a header, and a payload. The method performs time synchronization of the data received through corresponding paths of each antenna using corresponding preambles of the data. The method includes detecting a header from the data of each of the paths, and selecting a signal of a surviving path from among the paths based on the header or the preamble. The method further combines the signal existing in the surviving path to demodulate the payload.

The method includes detecting an envelope of data received from each of the paths.

The method also includes determining bits corresponding to the payload based on the combination of the signal existing in the surviving path.

The method includes calculating at least one parameter associated with a probability distribution of a sample in each path, based on the preamble, and correcting the sample in each path, using the at least one parameter.

A computer program embodied on a non-transitory computer readable medium is also provided. The computer program is configured to control a processor to perform the method described above.

Other features and aspects may be apparent from the following detailed description, the drawings, and the claims.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

Figure 1:
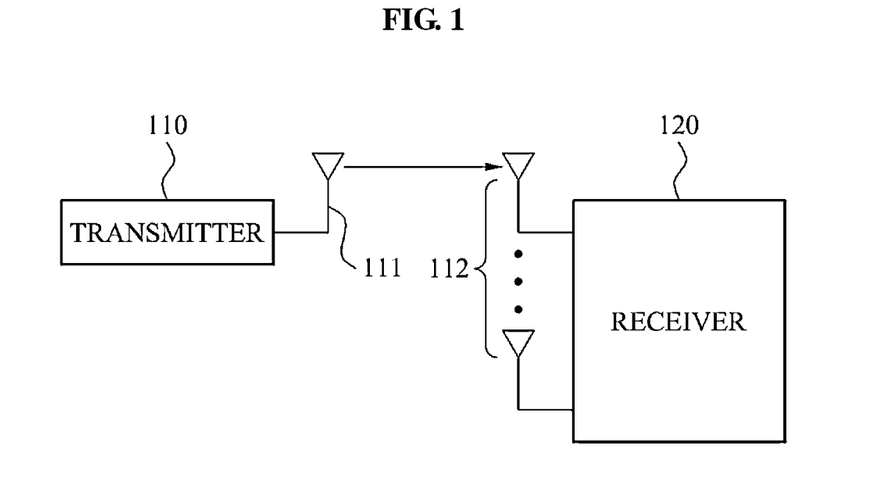
FIG. 1 is a diagram illustrating an example of a wireless communication system including a transmitter and a receiver, which includes a plurality of receiving antennas, in accordance with an illustrative example.

FIG. 1 illustrates an example of a wireless communication system including a transmitter and a receiver, which includes a plurality of receiving antennas, in accordance with an illustrative example.

Referring to FIG. 1, the wireless communication system may include a transmitter 110 and a receiver 120. The receiver 120 of the wireless communication system may include at least two receiving antennas 112, and the transmitter 110 may include at least one transmitting antenna 111.

When the receiver 120 includes a plurality of receiving antennas 112, different transmission paths may be formed between the transmitting antenna 111 of the transmitter 110 and the receiving antennas 112 of the receiver 120. The receiver 120 may obtain a diversity gain through the different transmission paths.

When the receiver 120 obtains a diversity gain through the receiving antennas 112, a reception sensitivity of the receiver 120 may increase. That is, the increase in the reception sensitivity may induce an increase in a reception distance of a receiver 120 or may induce a decrease in transmission power of the transmitter 110. Accordingly, a period of time during which a communication between the transmitter 110 and the receiver 120 is strong may increase irrespective of a limited capacity of a battery.

Figure 2:
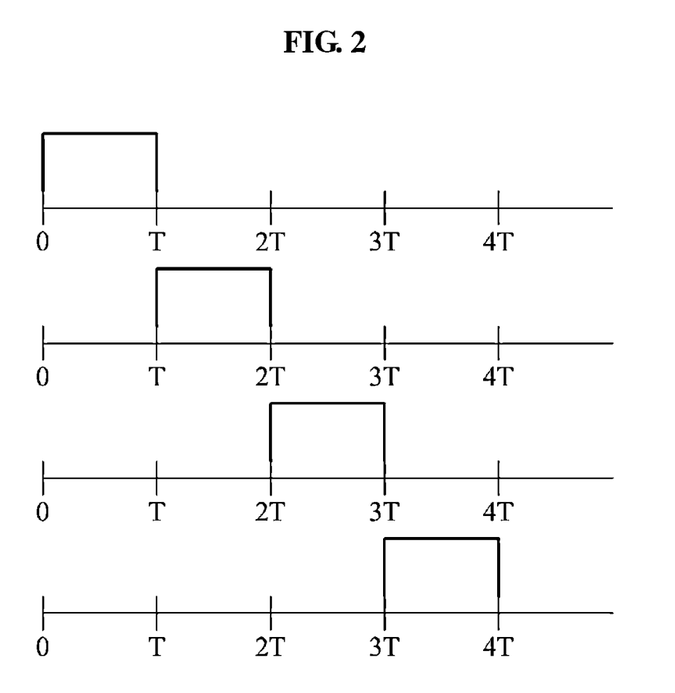
FIG. 2 is a diagram illustrating an example of a reduction of duty cycles when a transmitter uses a pulse position modulation (PPM) scheme, in accordance with an illustrative example.

FIG. 2 illustrates an example of a reduction of duty cycles when a transmitter uses a pulse position modulation (PPM) scheme, in accordance with an illustrative example.

The PPM scheme will be described as follows.

According to the PPM scheme, L bits may be mapped to $2^L$ code bits, and a single symbol section may be divided into $2^L$ sections. A pulse may be located in a symbol section corresponding to a code bit of '1'. Here, solely the code bit of '1' may exist in the $2^L$ code bits and remaining code bits may be set to '0'.

When L=3, a PPM symbol may be defined as below.

1) When Gray coding is applied
000→00000001
001→00000010
011→00000100
010→00001000
110→00010000
111→00100000
101→01000000
100→10000000

2) When Gray coding is not applied
000→00000001
001→00000010
010→00000100
011→00001000
100→00010000
101→00100000
110→01000000
111→10000000

When the PPM symbol is demodulated, a threshold to determine '0' and '1' may not be used. A receiver may select a greatest sample from among the $2^L$ samples, and may demodulate the sample based on a position of the sample, so as to obtain an original bit. To calculate a magnitude of the sample, the receiver may use an envelope detector and a square-law device at an analog-end.

Referring to FIG. 2, when two bits are mapped to a single symbol based on a PPM scheme, a duty cycle of the modulation may be decreased to ¼ of an original cycle. When the duty cycle is decreased to ¼ of the original cycle, an on-duration of a power amplifier of a transmitter may be reduced to ¼ of an original duration and thus, a power consumption of the transmitter may be reduced.

The power consumption of the transmitting end may be reduced by combining the PPM scheme and a multi-receiving antenna scheme.

Figure 3:
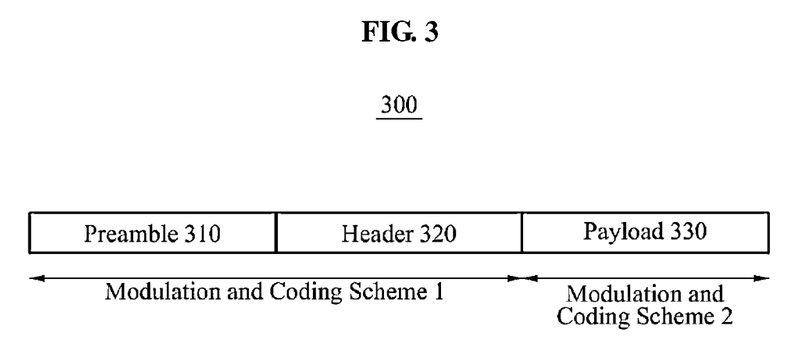
FIG. 3 is a diagram illustrating an example of data.

FIG. 3 illustrates an example of data 300.

Referring to FIG. 3, the data 300 may include a preamble 310, a header 320, and a payload 330. The data 300 may be transmitted and received in a form of a packet, and FIG. 3 may show a frame format of the packet.

The preamble 310 may be generated based on a pattern and a modulation scheme defined in advance between a transmitter and a receiver. The preamble 310 may be used to calculate a parameter required for time synchronization and detection of a symbol, for example, a PPM symbol.

The header 320 may also be generated based on a pattern and a modulation scheme defined, in advance, between the transmitter and the receiver. The header 320 may include a length indicator (LI), a transmission format indicator (TFI), and an error check bit, for example, a parity bit. The LI may indicate a length of the payload 330. The TFI may indicate a modulation scheme of the payload 330, a data rate, and a spreading factor.

The payload 330 may include information to be transmitted, the length of the payload 330 may be indicated by the LI of the header 320, and a transmission format of the payload 330 may be indicated by the TFI.

The preamble 310, the header 320, and the payload 330 may have the same transmission format or may have different transmission formats. For example, although each of the preamble 310 and the header 330 may have a transmission format defined in advance, between the transmitter and the receiver, the transmission format of the payload 330 may vary. In this example, the transmission format may be indicated by the header 320.

The header 320 may additionally include a reserved bit. The reserved bit may be used to additionally indicate a characteristic of the payload 330 afterward.

Varied transmission formats indicated by the TFI of the header 320 may be included in Table 1.

TABLE 1

| Index | Preamble | Payload | Rate |
|---|---|---|---|
| 1 | OOK, SF = 2 | OOK, SF = 1 | 1 |
| 2 | OOK, SF = 2 | OOK, SF = 2 | 0.5 |
| 3 | OOK, SF = 2 | PPM, SF = 4 | 0.5 |
| 4 | OOK, SF = 4 | PPM, SF = 8 | 0.375 |
| 5 | OOK, SF = 4 | OOK, SF = 4 | 0.25 |
| 6 | OOK, SF = 8 | PPM, SF = 16 | 0.25 |
| 7 | OOK, SF = 8 | OOK, SF = 8 | 0.125 |
| 8 | OOK, SF = 16 | OOK, SF = 16 | 0.0625 |

When the TFI indicates an index of '1', the TFI may indicate that the payload 330 is modulated based on an on-off keying (OOK) modulation scheme, a spreading factor is 1, and a data rate is 1. When the TFI indicates an index of '6', the TFI may indicate that the payload 330 is modulated based on a PPM modulation scheme, that a spreading factor is 16, and that a data rate is 0.25. Even though, Table 1 shows that the payload 330 may be modulated based on one of the OOK modulation scheme and the PPM scheme, embodiments may not be limited thereto.

For example, when a modulation scheme that is relatively sensitive to a performance of obtaining time synchronization information is applied to the payload 330, a modulation scheme that is advantageous to obtain the time synchronization information may be applied to the preamble 310. In this case, a combination of the OOK modulation scheme and the PPM scheme may be one such example.

Examples of the LI of the header 320 may be included in Table 2. As an example, LI b000 may indicate that the payload 330 corresponds to 9 bits. In this example, a payload size may be modulated based on the OOK modulation scheme or the PPM scheme. For example, when PPM L=3, the payload size may be designed to be a multiple of three so that data information transferred from an upper protocol may be effectively transmitted without an unnecessary padding process. When PPM L=3 and the payload size is not a multiple of three, a padding process may be needed to perform symbol mapping. Even though an embodiment assumes that L=3, embodiments may not be limited thereto. When L is a prime number, the payload size may be designed to be an integer multiple of a least common multiple of L values available in the PPM scheme.

TABLE 2

| Length Indicator | Payload Size |
|---|---|
| b000 | 9 |
| b001 | 12 |
| b010 | 15 |
| b011 | 21 |
| b100 | 24 |
| b101 | 27 |
| b110 | 39 |
| b111 | 69 |

Figure 4:
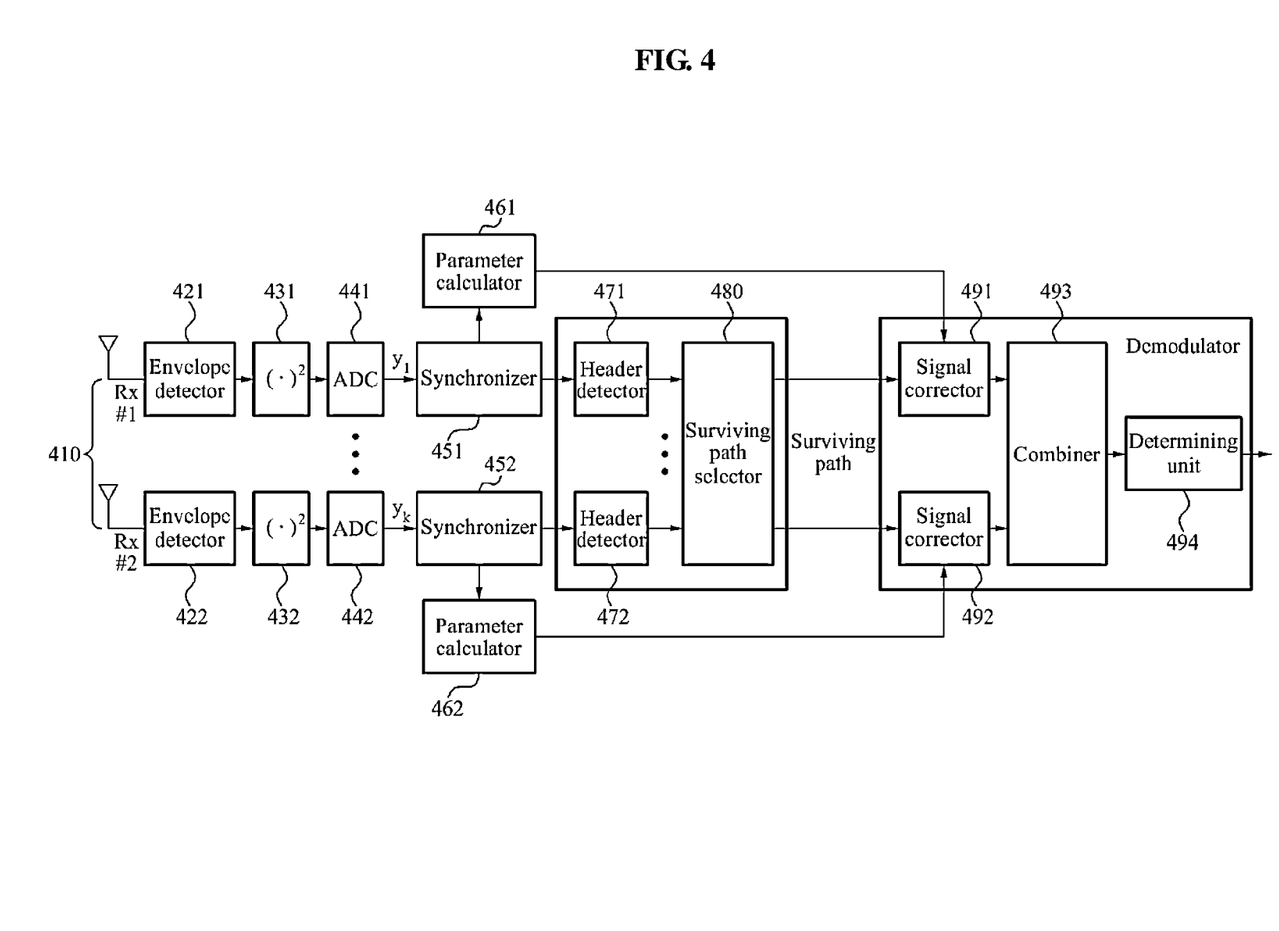
FIG. 4 is a block diagram illustrating an example of a receiver.

FIG. 4 illustrates an example of a receiver, in accordance with an illustrative example.

Referring to FIG. 4, the receiver may include K antennas 410. Each of the antennas 410 may have a unique or corresponding data path and, as a result, the receiver may have K different data paths. A signal received from each antenna 410 may be provided to envelope detectors 421 and 422, and the envelope detectors 421 and 422 may detect corresponding envelopes. The detected envelopes from the envelope detectors 421 and 422 may be provided to square-law devices 431 and 432, respectively.

An analog-digital converter (ADC) 441 and an ADC 442 may convert analog signals provided from the square-law device 431 and the square-law device 432 to digital signals, respectively. In this example, an $i^{th}$ sample of a digital signal, that is, '$y_{k,i}$', may be expressed by Equation 1. Here, i=1, 2, . . . , and $2^L$ for an L bit $$y_{k,i} = (y_{k,i}^{re})^2 + (y_{k,i}^{im})^2 \quad \text{[Equation 1]}$$

$$= \begin{cases} (s_k + n_k^{re})^2 + (n_k^{im})^2, & \text{for signal + noise} \\ (n_k^{re})^2 + (n_k^{im})^2, & \text{for noise} \end{cases}$$

In Equation 1, $y_{k,i}^{re}$ denotes a real component of $y_{k,i}$, and $y_{k,i}^{im}$ denotes an imaginary component of $y_{k,i}$. $S_k$ denotes an amplitude of a signal received by a $k^{th}$ antenna without a noise component when a transmitter transmits '1'. $n_k^{re}$ and $n_k^{im}$ may denote a real component and an imaginary component of a two-dimensional (2D) additive white Gaussian noise (AWGN) generated from the $k^{th}$ antenna. Here, the 2D AWGN may correspond to $n_k = n_k^{re} + jn_k^{im}$. $n_k^{re}$ may have a probability distribution of $N(0, \sigma_k^2)$, and $n_k^{im}$ may have a probability distribution of $N(0, \sigma_k^2)$. Antennas 410 may have different noise variance, respectively. That is, $\sigma_1^2 \neq \sigma_2^2 \neq \sigma_k^2$.

Synchronizers 451 and 452 may perform time synchronization with respect to the data of the corresponding paths using preambles received from the antennas 410. For example, to perform time synchronization, each of the synchronizers 451 and 452 may correlate a pattern of an input signal and a predetermined pattern using a preamble of the data having a predetermined pattern.

Using the preamble, parameter calculators 461 and 462 may calculate parameters associated with probability distributions of samples in the data of the corresponding paths. For example, each of the parameter calculators 461 and 462 may calculate a mean value and a variance value associated with a probability distribution of a corresponding sample. For example, a sample corresponding to '1' and a sample corresponding to '0' may be distinguished from each other. The parameter calculators 461 and 462 may calculate mean values and variance values associated with probability distributions of the sample corresponding to '1' and the sample corresponding to '0'.

The header detectors 471 and 472 may detect headers from the data of the corresponding paths. As described in the foregoing, a header may include a TFI and a LI, and a reserved bit. For example, each of the header detectors 471 and 472, may recognize a modulation scheme of a preamble, a data rate, a spreading factor, a length, and the like, using the TFI and the LI. In this example, the header may additionally include an error check bit and a parity bit. Accordingly, each header detector 471 and 472 may determine, based on the error check bit, whether the header is successfully modulated. In this example, whether the data in a corresponding path is determined to be data of a surviving path may be determined based on whether a header is successfully demodulated. In addition, each header detector 471 and 472 may determine data or signals of a surviving path based on whether headers of the data in the paths are the same, a number of the same headers of the data in the paths, and a reliability of data of a corresponding path. A payload transmitted after header information may be transmitted based on a modulation scheme, which is sensitive to acquisition of synchronization information. In turn, the header information may be transmitted based on a modulation scheme that may be less robust to acquisition of the synchronization information. Accordingly, determination of the data in a surviving path based on whether the header information is acquired may affect a combining gain being obtained during a process of combining signals in multiple paths. For purposes of brevity, hereinafter, a corresponding path or surviving path refers to the data or signals flowing in the corresponding path or the surviving path.

A surviving path selector 480 may select, at least, one surviving path from among paths based on the header or the preamble. For example, when the header is not demodulated well, the surviving path selector 480 may not select a path corresponding to the header as the surviving path.

Various criteria may be provided to select the surviving path, as detailed in the following.

1) When all headers in the paths are the same:

The surviving path selector 480 may select the all paths as surviving paths. However, a path corresponding to a header that is not modulated well may not be selected as a surviving path.

2) A number of the same headers among headers in the paths:

When a number of the same headers among the headers in the paths are relatively greater than a number of remaining headers, the surviving path selector 480 may select paths corresponding to the same headers as surviving paths.

3) When headers in the paths are different from each other:

The header may not be used as a criterion for selecting a surviving path. In this example, the surviving path selector 480 may consider a reliability of each path. The reliability of each path may be determined based on an amplitude ($s_k$) of a signal component of a received signal, a ratio ($s_k^2/\sigma_k^2$ or ($\mu_{k,1}-\mu_{k,0}$)) of power of a signal component to power of a noise component, and a signal-to-noise ratio (SNR). For example, a path may be selected as a surviving path that may correspond to $s_k$ of a highest signal component or a signal component greater than or equal to a predetermined threshold, $s_k^2/\sigma_k^2$ or ($\mu_{k,1}-\mu_{k,0}$) of power of a noise component to power of a signal component, or a signal-to-noise ratio (SNR).

For example, when at least one surviving path is determined, a negligible time error may exist among the at least one surviving path. In this example, a signal alignment may be performed to perform accurate combining.

Also, each signal corrector, for example, signal correctors 491 and 492, may correct a sample in each path based on parameters calculated by a corresponding parameter calculator, for example, the parameter calculators 461 and 462. That is, the signal correctors 491 and 492 may reduce an effect of noise generated in paths, which will be later described.

Here, the signal correctors 491 and 492 may correct samples in surviving paths and the corrected samples may be provided to a combiner 493. The combiner 493 may combine the corrected samples. Based on a PPM scheme, the determining unit 494 may determine an OOK demodulation scheme, or the like and original bits from the combined samples.

One or more of the envelope detectors 421 and 422, the square-law devices 431 and 432, the ADCs 441 and 442, the synchronizers 451 and 452, the parameter calculators 461 and 462, the header detectors 471 and 472, and the signal correctors 491 and 492 may physically exist for each path or may exist for all paths. For example, K synchronizers may exist or a single synchronizer may exist. Although a single synchronizer exists, in accordance with an illustrative example, the synchronizer may logically perform functions of K synchronizers.

Referring again to ADCs 441 and 442 of FIG. 4, an $i^{th}$ sample output from a $k^{th}$ ADC;

that is, $y_{k,i}$, may have varied types of probability distributions. For example, $y_{k,i}$ may be one of a Chi-square distribution and an asymmetric Gaussian distribution, or may be another type of a probability distribution. Embodiments may use a different signal correction scheme based on a type of a probability distribution of $y_{k,i}$.

The illustrative configuration described above with respect to FIG. 4 includes two or more envelope detectors 421 and 422, ADCs 441 and 442, parameter calculators 461 and 462, synchronizers 451 and 452, header detectors 471 and 472, and signal correctors 491 and 492. However, a person of ordinary skill in the relevant art will appreciate that more than two envelope detectors, ADCs, parameter calculators, synchronizers, header detectors, and/or signal correctors may be equally implemented. Furthermore, a single envelope detector, a single ADC, a single parameter calculator, a synchronizer, a single header detector, and/or a single signal corrector may be used to achieve the same illustrative configuration as described in FIG. 4.

Figure 5:
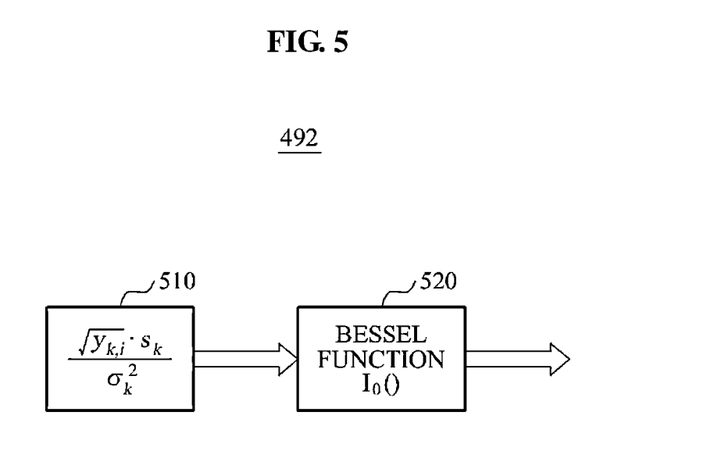
FIG. 5 is a diagram illustrating an example of a signal corrector of FIG. 4.

FIG. 5 illustrates an example of the signal corrector 492 of FIG. 4.

Referring to FIG. 5, the signal corrector 492 is illustrated when $Y_{k,i}$ has a Chi-square distribution. It is assumed that a determiner in the signal corrector 492 uses a maximum likelihood decision scheme.

When $y_{k,i}$ has a Chi-square distribution, $y_{k,i}$ may have a probability density function (PDF) as shown below.

$$p_{Y_{k,i}}(y_{k,i}) = \begin{cases} \dfrac{1}{2\sigma_k^2}\exp\left(\dfrac{-(y_{k,i}+s_k^2)}{2\sigma_k^2}\right)I_o\left(\dfrac{\sqrt{y_{k,i}}\cdot s_k}{\sigma_k^2}\right), \\ \text{for signal} + \text{noise} \\ \text{(noncentral } Chi\text{-}square \text{ with 2-degree of freedom)} \\ \dfrac{1}{2\sigma_k^2}\exp\left(\dfrac{-y_{k,i}}{2\sigma_k^2}\right), \\ \text{for noise} \\ \text{(central } Chi\text{-}square \text{ with 2-degree of freedom)} \end{cases} \qquad \text{[Equation 2]}$$

In Equation 2, $I_0(\ )$ denotes a modified Bessel function of the first kind. $\mu_{k,1}$ denotes a mean of signal+noise of a $k^{th}$ antenna. $\mu_{k,0}$ denotes a mean of noise of the $k^{th}$ antenna. $\sigma_{k,1}^2$ denotes a variance of signal+noise of the $k^{th}$ antenna. $\sigma_{k,0}$ denotes a variance of noise of the $k^{th}$ antenna.

When a sample that passes through an ADC has a Chi-square distribution, a decision statistic, shown below, may be obtained based on a PDF of a sample including a noise component and a sample including a signal component.

$$\Lambda(Y) = \operatorname*{argmax}_i \prod_{k=1}^{K} \left( \frac{\underbrace{\frac{1}{2\sigma_k^2} \exp\left(\frac{-(y_{k,i} + s_k^2)}{2\sigma_k^2}\right) I_0\left(\frac{\sqrt{y_{k,i}} \cdot s_k}{\sigma_k^2}\right)}_{\text{one sample of (signal+noise)}}}{\underbrace{\prod_{j=1, j \neq i}^{2L} \frac{1}{2\sigma_k^2} \exp\left(\frac{-y_{k,j}}{2\sigma_k^2}\right)}_{2^L-1 \text{ samples of noise}}} \right) \quad \text{[Equation 3]}$$

Equation 3 may be approximated to Equation 4.

$$\Lambda(Y) = \operatorname*{argmax}_i \prod_{k=1}^{K} I_0\left(\frac{\sqrt{y_{k,i}} \cdot s_k}{\sigma_k^2}\right). \quad \text{[Equation 4]}$$

As shown in Equation 4, a PPM symbol may be detected by measuring a noise variance $\sigma_k^2$ and a signal amplitude $s_k$ for each path. Here, operational units, for example, a square-root unit, a multiplier, a divider, and the like, may be required.

A set 510 of operational units may calculate $$\frac{\sqrt{y_{k,i}} \cdot s_k}{\sigma_k^2},$$

and a Bessel function device 520 may apply the modified Bessel function of the first kind with respect to $$\frac{\sqrt{y_{k,i}} \cdot s_k}{\sigma_k^2}.$$

An output of the Bessel function device 520 may be provided to the signal corrector 492. In this example, the determiner may detect an optimal symbol, for example, a PPM symbol, based on a criterion defined by Equation 4, and may output bits corresponding to the detected symbol.

However, the modified Bessel function of the first kind may be difficult to be configured. Accordingly, an illustrative embodiment may include the signal corrector 492 based on a configuration of FIG. 6.

Figure 6:
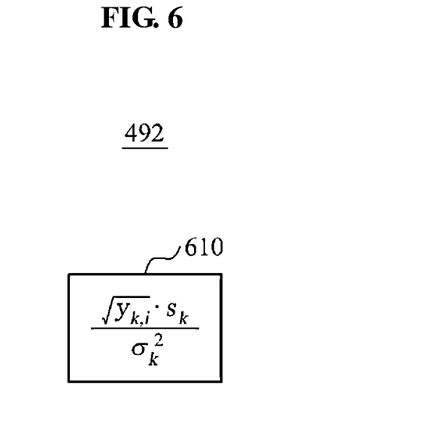
FIG. 6 is a diagram illustrating another example of a signal corrector of FIG. 4.

An approximation may be performed as shown in $$I_0(z) \cong \frac{\exp(z)}{\sqrt{2\pi z}}.$$

In this example, Equation 4 may be modulated to Equation 5 based on Equation 4 and the approximation.

$$\Lambda(Y) \approx \operatorname*{argmax}_i \prod_{k=1}^{K} \frac{\exp\left(\frac{\sqrt{y_{k,i}} \cdot s_k}{\sigma_k^2}\right)}{\sqrt{2\pi \left(\frac{\sqrt{y_{k,i}} \cdot s_k}{\sigma_k^2}\right)}} \quad \text{[Equation 5]}$$

$$= \operatorname*{argmax}_i \sum_{k=1}^{K} \left( \frac{\sqrt{y_{k,i}} \cdot s_k}{\sigma_k^2} - \frac{1}{2} \ln\left(\frac{\sqrt{y_{k,i}} \cdot s_k}{\sigma_k^2}\right) \right)$$

In Equation 5, a $\ln(\ )$ part may not affect a performance significantly. That is, a solution that ignores the $\ln(\ )$ part may be a viable solution to reduce hardware complexity. Accordingly, the approximated decision statistic may be expressed by Equation 6.

$$\operatorname*{argmax}_i \sum_{k=1}^{K} \left( \frac{\sqrt{y_{k,i}} \cdot s_k}{\sigma_k^2} \right) \quad \text{[Equation 6]}$$

The signal corrector 492 may include a set 610 of operational units, as illustrated in FIG. 6.

Figure 7:
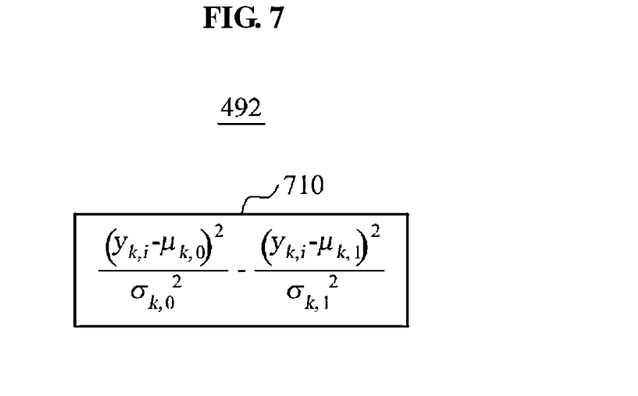
FIG. 7 is a diagram illustrating still another example of a signal corrector of FIG. 4.

FIG. 7 illustrates still another example of the signal corrector 492 of FIG. 4, in accordance with an illustrative configuration.

When $y_{k,1}$ has an asymmetric Gaussian distribution, a decision statistic may be obtained based on a PDF of a sample including a noise component and a sample including a signal component, as expressed by Equation 7.

$$\Lambda(Y) = \quad \text{[Equation 7]}$$

$$\operatorname*{argmax}_i \prod_{k=1}^{K} \left[ \frac{\underbrace{\frac{1}{\sqrt{2\pi\sigma_{k,1}^2}} \exp\left(\frac{-(y_{k,i} - \mu_{k,1})^2}{2\sigma_{k,1}^2}\right)}_{Signal+Noise}}{\underbrace{\prod_{n=1, n \neq i}^{L} \frac{1}{\sqrt{2\pi\sigma_{k,0}^2}} \exp\left(\frac{-(y_{k,i} - \mu_{k,0})^2}{2\sigma_{k,0}^2}\right)}_{Noise}} \right]$$

When a natural logarithm is applied to Equation 7, Equation 8 may be obtained.

$$\Lambda(Y) = \operatorname*{argmin}_i \sum_{k=1}^{K} \left( \frac{(y_{k,i} - \mu_{k,1})^2}{2\sigma_{k,1}^2} + \sum_{n=1, n \neq i}^{L} \frac{(y_{k,n} - \mu_{k,0})^2}{2\sigma_{k,0}^2} \right) \quad \text{[Equation 8]}$$

$$= \operatorname*{argmin}_i \sum_{k=1}^{K} \left( \frac{(y_{k,i} - \mu_{k,1})^2}{2\sigma_{k,1}^2} - \frac{(y_{k,i} - \mu_{k,0})^2}{2\sigma_{k,0}^2} \right)$$

$$= \operatorname*{argmax}_i \sum_{k=1}^{K} \left( \frac{(y_{k,i} - \mu_{k,0})^2}{\sigma_{k,0}^2} - \frac{(y_{k,i} - \mu_{k,1})^2}{\sigma_{k,1}^2} \right)$$

As shown in Equation 8, a PPM symbol may be detected by calculating a mean ($\mu_{k,1}$) and a noise variance ($\sigma_{k,1}^2$) and a mean ($\mu_{k,0}$) and a noise variance ($\sigma_{k,0}^2$) when a signal component does not exist. In this example, operating units, for example, a multiplier, a divider, and the like may be utilized.

Accordingly, the signal corrector 492 may be embodied based on a set 710, as illustrated in FIG. 7.

Figure 8:
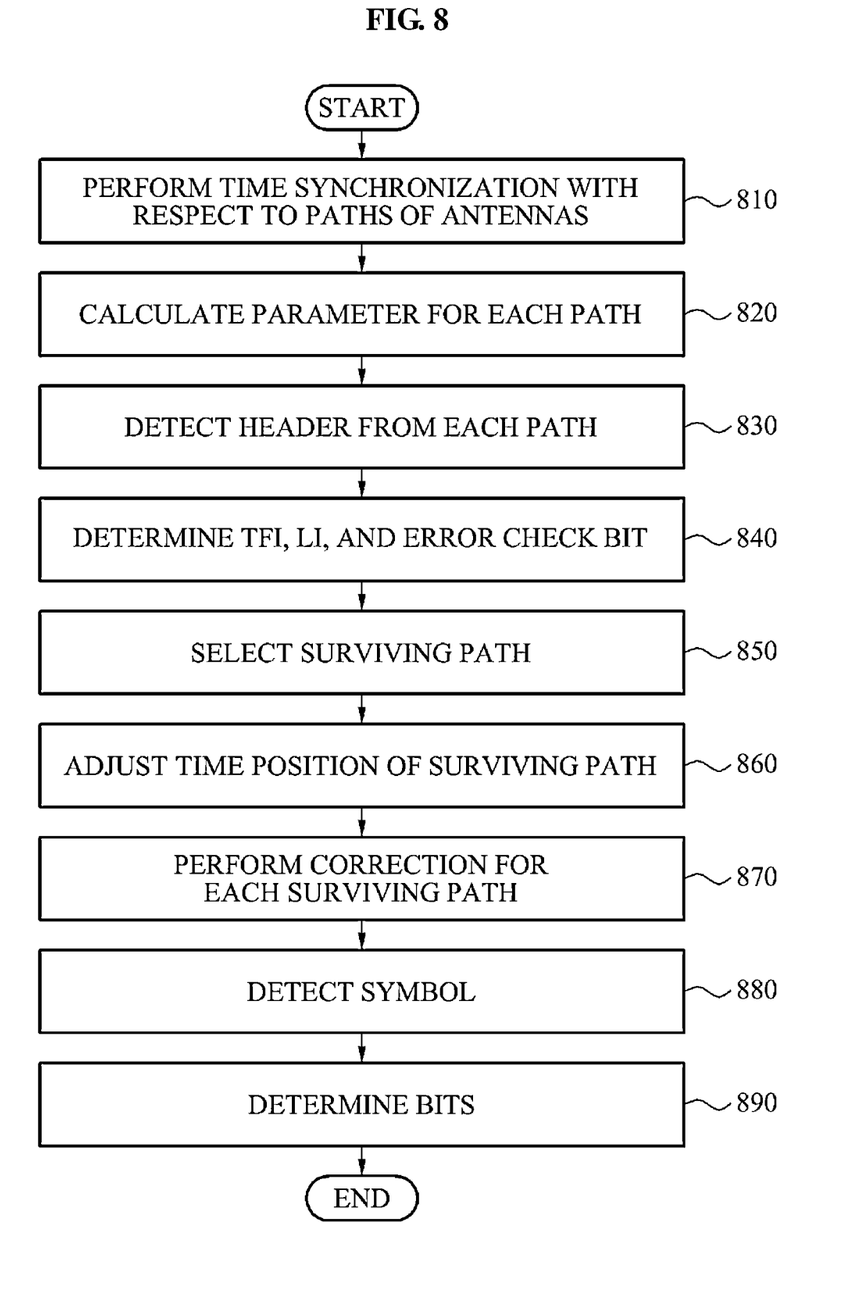
FIG. 8 is a flowchart illustrating an example of a method for a receiver, in accordance with an illustrative example.

FIG. 8 illustrates an example of a method for a receiver, in accordance with an illustrative example.

Referring to FIG. 8, based on corresponding preambles of the paths in 810, the method may perform time synchronization with respect to paths corresponding to at least two receiving antennas.

In 820, based on a corresponding preamble, the method may calculate at least one parameter associated with a probability distribution of a sample in each path.

In 830, the method may detect a header from each path.

In 840, the method may determine a TFI, a LI, and an error check bit included in the header.

In 850, the method may select at least one surviving path from among the paths based on the header or the preamble.

In 860, the method may adjust a time position among surviving paths.

In 870, the method may correct a sample in each path based on the at least one parameter.

In 880, the method may detect an optimal symbol, for example, a PPM symbol and the like, by performing combining.

In 890, the method may determine original bits based the detected symbol.

The method according to the above-described example embodiments may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described example embodiments, or vice versa. In addition, a non-transitory computer-readable storage medium may be distributed among computer systems connected through a network and non-transitory computer-readable codes or program instructions may be stored and executed in a decentralized manner.

The units, the combiner, the detectors, the selectors, the calculators, and the correctors described herein may be implemented using hardware components. For example, microphones, amplifiers, band-pass filters, audio to digital convertors, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

One having ordinary skill in the art will readily understand that the invention as discussed above may be practiced with steps in a different order, and/or with hardware elements in configurations which are different than those which are disclosed. A number of example embodiments have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A receiver of a wireless communication system, the receiver comprising:
    antennas configured to receive, through each of respective paths, data comprising a preamble, a header, and a payload;
    a synchronizer configured to perform time synchronization of the data of each of the paths based on the preamble of the data of each of the paths;
    a header detector configured to detect the header of the data of each of the paths;
    a surviving path selector configured to select a surviving path from the paths based on the header or the preamble of the data of each of the paths; and
    a combiner configured to combine the data of the surviving path to demodulate the payload of the data of the surviving path,
    wherein the surviving path selector is further configured to select, from the paths, surviving paths corresponding to the same headers, among headers of the respective paths, in response to a number of the same headers being relatively greater than a number of remaining headers, among the headers.

2. The receiver of claim 1, further comprising:
    an envelope detector configured to detect an envelope of the data of each of the paths, and provide, to the synchronizer, the detected envelope of the data of each of the paths.

3. The receiver of claim 1, further comprising:
    a determining unit configured to determine bits corresponding to the payload of the data of the surviving path based on the combined data of the surviving path.

4. The receiver of claim 3, wherein the determining unit is further configured to determine the bits based on a pulse position demodulation (PPD) scheme in response to the payload of the data of the surviving path being modulated based on a pulse position modulation (PPM) scheme.

5. The receiver of claim 1, further comprising:
    a parameter calculator configured to calculate a parameter of a probability distribution of a sample of each of the paths based on the preamble, of the data of each of the paths; and
    a signal corrector configured to correct the sample of each of the paths based on the parameter of each of the paths.

6. The receiver of claim 5, wherein the signal corrector is further configured to correct the sample of each of the paths based on the parameter of each of the paths, and a type of the probability distribution of the sample of each of the paths.

7. The receiver of claim 6, wherein the type of the probability distribution of the sample of each of the paths comprises a chi-square distribution or an asymmetrical Gaussian distribution.

8. The receiver of claim 1, wherein:
the header detector is further configured to detect an error check bit included in the header of the data of each of the paths; and
the surviving path selector is further configured to select the surviving path from the paths based on the error check bit of each of the paths.

9. The receiver of claim 1, wherein:
the header comprises a transmission format indicator (TFI) of the payload or a length indicator (LI); and
the TFI indicates a modulation scheme of the payload, or a spreading factor, or a data rate, or any combination thereof.

10. The receiver of claim 1, wherein the surviving path selector is further configured to select the surviving path from the paths based on whether the headers are the same, or a number of the same headers, among the headers, or a reliability of each of the paths, or any combination thereof.

11. The receiver of claim 1, further comprising:
a parameter calculator configured to calculate a mean and/or a variance of a probability distribution of a sample of each of the paths; and
a signal corrector configured to correct the sample of each of the paths based on the mean and/or the variance of each of the paths.

12. The receiver of claim 1, wherein the surviving path selector is further configured to select all of the paths in response to the headers being the same.

13. The receiver of claim 1, wherein the surviving path selector is further configured to select the surviving path from the paths based on a reliability of each of the paths in response to the headers being different from each other.

14. The receiver of claim 13, wherein the reliability of each of the paths is determined based on an amplitude of a signal component of a received signal, a ratio of power of the signal component to power of a noise component of the received signal, and a signal-to-noise ratio of the received signal.

15. A method of a receiver of a wireless communication system, the method comprising:
receiving, through each of paths of respective antennas, data comprising a preamble, a header, and a payload;
performing time synchronization of the data of each of the paths based on the preamble of the data of each of the paths;
detecting the header of the data of each of the paths;
selecting a surviving path from the paths based on the header or the preamble of the data of each of the paths;
combining the data of the surviving path to demodulate the payload of the data of the surviving path; and
selecting, from the paths, surviving paths corresponding to the same headers, among headers of the respective paths, in response to a number of the same headers being relatively greater than a number of remaining headers, among the headers.

16. The method of claim 15, further comprising:
detecting an envelope of the data of each of the paths.

17. The method of claim 15, further comprising:
determining bits corresponding to the payload of the data of the surviving path based on the combined data of the surviving path.

18. The method of claim 15, further comprising:
calculating a parameter of a probability distribution of a sample of each of the paths based on the preamble of the data of each of the paths; and
correcting the sample of each of the paths based on the parameter of each of the paths.

19. A non-transitory computer-readable storage medium storing a program comprising instructions to cause a processor to perform the method of claim 15.

* * * * *